Nov. 2, 1965     M. M. ROSENFELD     3,215,561
APPARATUS FOR GENERATING ELECTRICITY
AND HEATING ARTICLES
Filed Sept. 19, 1961
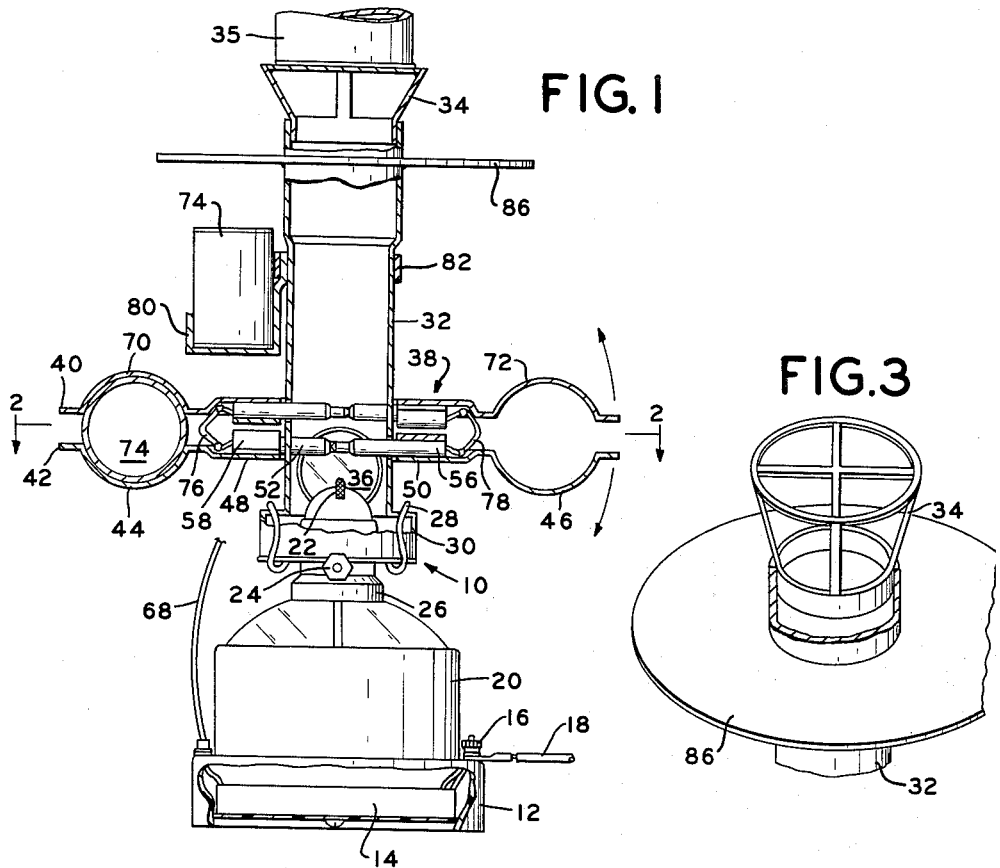
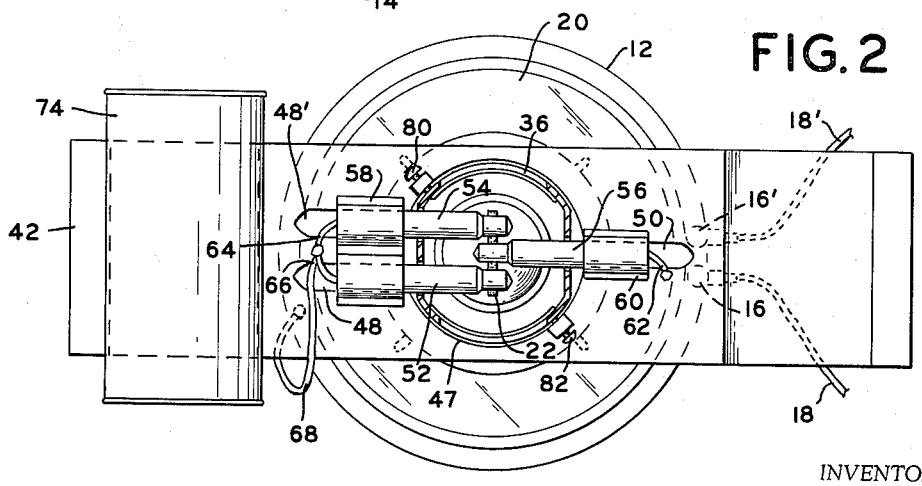
INVENTOR.
MORTON M. ROSENFELD
BY 
ATTORNEY United States Patent Office 3,215,561
Patented Nov. 2, 1965

3,215,561
APPARATUS FOR GENERATING ELECTRICITY AND HEATING ARTICLES
Morton M. Rosenfeld, Mount Vernon, N.Y.
(271 Madison Ave., New York, N.Y.)
Filed Sept. 19, 1961, Ser. No. 139,191
6 Claims. (Cl. 136—4)

This invention relates to apparatus for generating electricity and heating articles such as canned food and the like.

Recent information indicates that persons may be required to remain in a bomb shelter for periods of a month or more. During this time, a means must be provided to generate electricity for operating radios, transmitters, etc. Such means should be simple, economical and reliable.

The apparatus of the present invention includes a fuel burner of the type conventionally utilized in kerosene lamps. Air cooled bimetallic thermoelectric elements are provided with one end being disposed in the heat zone of the lamp to generate electricity. The thermoelectric elements are air cooled by means of large fins. The fins are designed so as to have an article receiving portion such as a can of food. The can of food is heated by absorbing heat by conduction from the fins. In this manner, the food may be cooked while at the same time increasing the temperature variant of the thermoelectric elements thereby generating electricity more efficiently. In addition, food may be cooked on a spider support disposed on the upper end of a pipe through which the thermoelectric elements extend so as to be disposed in the heat zone. Thus, the present invention utilizes as much of the heat as possible to cook food or heat articles while more efficiently converting the heat to electricity for operating radios and the like.

While the apparatus of the present invention is primarily designed for use in bomb shelters, it may be utilized in the home as an emergency source of electricity, heat or light when power lines have been temporarily disconnected because of a storm. Also, the apparatus of the present invention may be utilized in places such as summer cottages, outdoor camps, on pleasure boats, etc.

It is another object of the present invention to provide apparatus for more efficiently converting heat to electricity while accommodating articles to be heated.

It is another object of the present invention to provide a novel apparatus for heating articles of food.

It is another object of the present invention to provide a novel apparatus for heating food while generating electricity for operating a radio or the like.

Other objects will appear hereinafter.

For the purpose of illustrating the invention there is shown in the drawings a form which is presently preferred; it being understood, however, that this invention is not limited to the precise arrangements and instrumentalities shown.

FIGURE 1 is an elevational view of the apparatus of the present invention partly in section and partly broken away for purposes of illustration.

FIGURE 2 is a sectional view taken along the lines 2—2 in FIGURE. 1.

FIGURE 3 is a perspective view of the upper portion of the apparatus illustrated in FIGURE 1 with portions broken away for purposes of illustration.

Referring to the drawing in detail, wherein like numerals indicate like elements, there is shown in FIGURE 1 an apparatus for generating electricity and heating articles designated generally as 10.

The apparatus 10 comprises a cylindrical base 12. A battery 14 is supported within the base 12. The battery 14 is provided wtih terminals 16 and 16' to which wires 18 and 18', respectively, are adapted to be connected.

The wires 18 and 18' have ends, not shown, which are adapted to be connected to a radio or some other electrically operated device.

A fuel reservoir 20 is mounted on the base 12 and is adapted to contain a combustible fuel such as kerosene. A head portion 26 is mounted on the reservoir 20. The head portion 26 includes a wick 22. The position of the wick may be adjusted by means of the wick adjuster 24. The end of the wick 22 opposite from the end shown in FIGURE 1 is disposed within the supply of fuel in the reservoir 20. Elements 20–26 are conventional in kerosene lamps as proposed heretofore and may be referred to hereinafter as a fuel burner.

A plurality of flexible clips 28 extend from the body portion 26 and are selectively manipulative for securing the base portion 30 of a pipe 32 to the body portion 26. The pipe 32 is preferably made of metal and is annular in transverse cross section. A web-like grille 34 is disposed on the upper end of the pipe 32. An article such as a can of food 35 may be disposed on the grille 34.

The lower portion of the pipe 32 adjacent the base portion 30 is provided with a pair of windows 36 (only one is shown) on diametrically opposite portions thereof. The windows 36 are preferably made from a transparent heat resistant material such as mica and provide a small amount of illumination for the room within which the apparatus 10 is disposed. The pipe 32 is preferably made from metal which is of sufficient thickness so as to support the weight of a means for generating electricity and heating articles designated generally as 38.

The means 38 comprises a plurality of fins. As illustrated, the means 38 includes a fin 40 and a fin 42. The fins 40 and 42 are substantially planar except for arcuate portions as will be made clear hereinafter. The fins 40 and 42 are identical. Accordingly, only fin 42 will be described in detail.

The fin 42 is made from an elongated substantially rectangular sheet of metal. The fin 42 is provided with arcuate portions 44 and 46 adjacent its ends for a purpose to be made clear hereinafter. The arcuate portions 44 and 46 extend across the width of the fin 42. The fin 42 is also provided with a hole 47 extending therethrough at a point substantially equidistant from its ends. The pipe 32 extends through the hole 47.

The fin 42 is provided with a pair of parallel arcuate portions 48 and 48' extending longitudinally from the hole 47 toward the arcuate portion 44. The fin 42 is also provided with an arcuate portion 50 extending from the hole 47 toward the arcuate portion 46.

The arcuate portions 48, 48' and 50 are in line with holes in the pipe 32. A thermoelectric element 52 is disposed within the arcuate portion 48. A thermoelectric element 54 is disposed within the arcuate portion 48'. A thermoelectric element 56 is disposed within the arcuate portion 50. The elements 52, 54 and 56 extend through the holes in the pipe 32 so that their tip portion is disposed above the wick 22. The elements 52 and 54 are rigidly secured to the fin 42 by means of a collar 58. The element 56 is rigidly secured to the fin 42 by means of a collar 60.

The end of the element 56 remote from its tip portion is grounded to the fin 42 by means of wire 62. The end of element 52 remote from its tip is grounded to the fin 42 by means of wire 66. The end of element 54 remote from its tip is grounded to the fin 42 by means of wire 64. The fin 42 is electrically connected to the battery 14 by means of wire 68.

The fin 40 is identical with the fin 42. When the fin 40 is mounted on the pipe 32, it is inverted so that the thermoelectric elements on the fin 40 are juxtaposed to the thermoelectric elements on the fin 42. In this manner, the arcuate portion 70 on the fin 40 may cooperate with the arcuate portion 44 to provide a housing for supporting a can of food 74. In like manner, the arcuate portion 72 on the fin 40 may cooperate with the arcuate portion 46 to provide a housing for another can of food 74. The thermoelectric elements on the fin 40 are electrically connected to the fin 42 by means of wires 76 and 78.

Each of the fins 40 and 42 are secured to the pipe 32 by means of a pair of setscrews such as setscrews 80 and 82 which extend through tubular bushings on their respective fins. The setscrews 80 and 82 secure the fins to the pipe 32 so that the thermoelectric elements are disposed above the wick 22 at the location of the hottest part of the flame. As illustrated, the fins 40 and 42 are provided with a hole through which the pipe 32 extends. For ease of assembly, the fins 40 and 42 may be composed of two separable portions.

The structure of the thermoelectric elements, per se, is well known to those skilled in the art and need not be described in detail for purposes of the present invention. For purposes of illustration, the thermoelectric elements described above and illustrated in the drawing may be of the hermetically sealed type illustrated in U.S. Patent 2,790,021. In practice, the thermoelectric elements provide a power output of approximately 150 millivolts with a low output voltage of from three to nine volts. In order to attain such output voltage, heretofore the thermoelectric elements were provided with an air cooled fin having approximately ten square inches of surface area. Each of the fins 40 and 42 may have a surface area as low as twenty square inches while accommodating three thermoelectric elements. By providing arcuate portions for accommodating the cans 74, the difference in temperature between the tips of the thermoelectric elements disposed over the flame and the air cooled fins is greater since the cans 74 absorb heat from the fins. By absorbing heat from the fins, the food within the can 74 is cooked while at the same time the efficiency of the thermoelectric elements is increased. While a can of food 74 is being cooked on opposite ends of the fins, a can 34 may be cooked on the grille 34.

In addition to the cans being heated on the fins and the grille 34, cans may be heated on a cup-shaped support 80. The support 80 is releasably secured to pipe 32 by a strap 82 and conventional securing elements (not shown). Alternatively, the strap 82 may be rigidly secured to the pipe 32. Also, cans of food or food in other shapes may be cooked on the shelf 86. The inner periphery of the shelf 86 is rigidly secured to the pipe 32 in any convenient manner such as by welding, brazing, sweating, a releasable clamp, etc. The shelf 86 may be used to fry foods such as eggs. If desired, any one or all of the above-mentioned means may be utilized to support an article such as food so that it may be heated or cooked by the heat of the burner. The support 80, strap 82 and shelf 86 are made of a good heat conductive material such as aluminum.

Hereinafter, the elements 20-26 may be referred to as a source of heat. Also, the grille 34, the arcuate portions 44 and 46, the support 80 and/or the shelf 86 may be referred to as an article receiving means.

The present invention may be embodied in other specific forms without departing from the spirit or essential attributes thereof and, accordingly, reference should be made to the appended claims, rather than to the foregoing specification as indicating the scope of the invention.

I claim:

1. Apparatus comprising a fuel burner, an annular pipe removably connected to said burner, said pipe and said burner being spatially related so that heat from said burner passes through said pipe, thermoelectric means for generating electricity, a portion of said thermoelectric means extending through said pipe into the heat from said burner, first and second cooling fin means connected in thermal conductive supporting relation with said thermoelectric means, said first and second cooling fin means being supported in upper and lower spaced apart relation on said pipe, said first fin including downwardly depending arcuate portions on opposite sides of said pipe, said second fin being similar to said first fin, said second fin being supported on said pipe in inverted relation to said first fin, the arcuate portions on said second fin and the arcuate portions on said first fin defining an article receiving and retaining means, whereby said arcuate portions support articles of food to be heated, and whereby in so heating said articles of food the temperature differential between the end portions of said thermoelectric means is increased.

2. Apparatus in accordance with claim 1 wherein a pair of light transmitting windows are provided in said pipe.

3. Apparatus in accordance with claim 1 wherein said arcuate portions are adapted to make thermal conducting contact of a substantial portion of the article to be retained.

4. Apparatus comprising a source of heat, a pipe removably mounted above said source of heat, said source of heat and said pipe being spatially arranged so that heat from said source of heat passes through said pipe, a first cooling fin mounted on said pipe, said first fin having an opening and said pipe extending through said opening, said first fin including downwardly depending arcuate portions on opposite sides of said opening, a second fin similar to said first fin, said second fin being mounted on said pipe in spaced apart and inverted relation to said first fin, the arcuate portions on said second fin and the arcuate portions on said first fin defining an article receiving and retaining means, thermoelectric means for generating electricity supported by said first and second fins, said thermoelectric means having one end extending through openings in said pipe into the heat from said source of heat, supporting means supporting said thermoelectric means on said first and second fins so that the other end of said thermoelectric means is in thermal conducting relationship to said fins, whereby said articles retained by said fins are heated, and whereby the temperature differential between the ends of said thermoelectric means is increased.

5. Apparatus in accordance with claim 4 wherein said pipe is provided with a pair of windows through which light from said heat source may pass.

6. Apparatus in accordance with claim 4 wherein said food supporting means comprises a grille on the end of said pipe remote from said heat source and an annular disk supported to said pipe intermediate the ends of said pipe and above said first and second fins.

References Cited by the Examiner

UNITED STATES PATENTS

| 127,082 | 5/72 | McConnel | 126—100 |
| 136,104 | 2/73 | Silber et al. | 126—47 |
| 559,153 | 4/96 | Upton | 126—47 |
| 704,596 | 7/02 | Thwing | 136—4 |
| 1,286,429 | 12/18 | Shindel | 136—4 |
| 2,410,872 | 11/46 | Findley | 136—4 |
| 3,056,848 | 10/62 | Meyers | 136—4 |
| 3,057,340 | 10/62 | Fritts | 126—110 |

FOREIGN PATENTS

| 512,630 | 6/19 | France. |
| 131,877 | 6/02 | Germany. |
| 4,413 | 3/91 | Great Britain. |

OTHER REFERENCES

Ioffe: "Semiconductor Thermoelements and Thermoelectric Cooling," 1956, pages 86–88.

WINSTON A. DOUGLAS, *Primary Examiner.*

JOHN H. MACK, *Examiner.*